Sept. 22, 1959　　　A. L. STOECKEL ET AL　　　2,905,310
WEIGHING CONVEYOR
Filed Sept. 24, 1957　　　　　　　　　　　　4 Sheets-Sheet 4
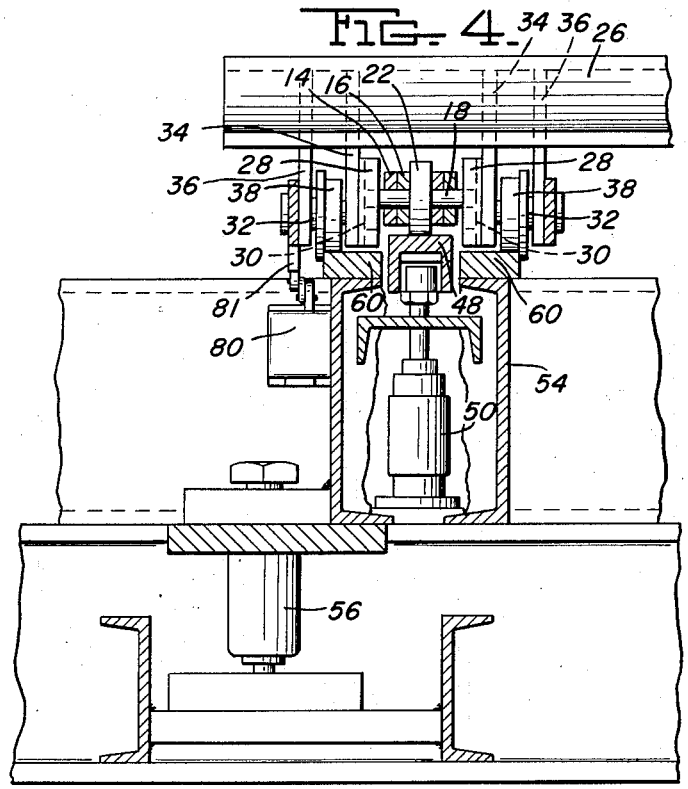
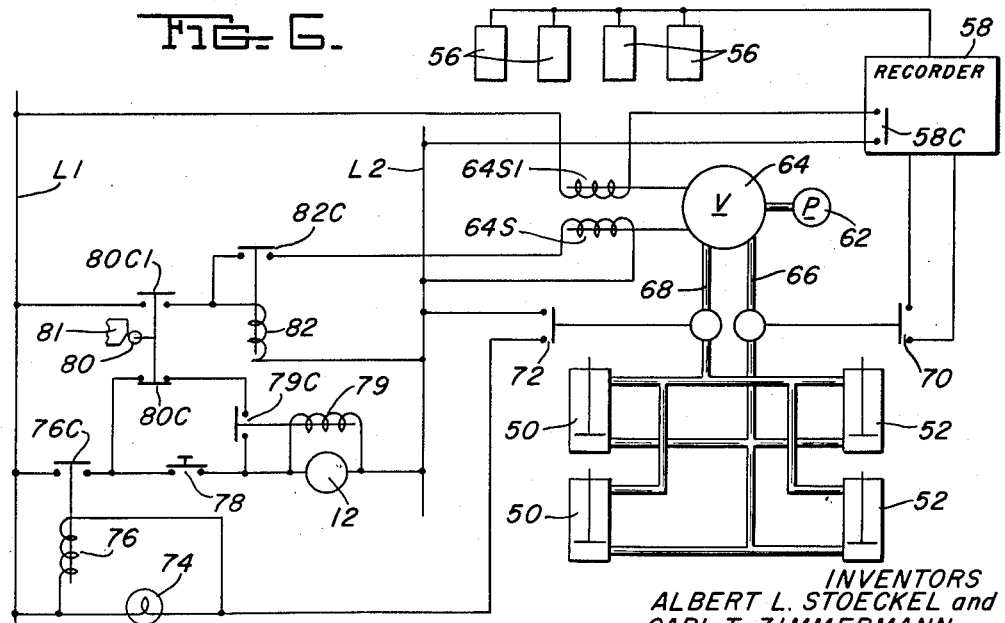
INVENTORS
ALBERT L. STOECKEL and
CARL T. ZIMMERMANN
By: Donald G. Dalton
Attorney

# United States Patent Office 2,905,310
Patented Sept. 22, 1959

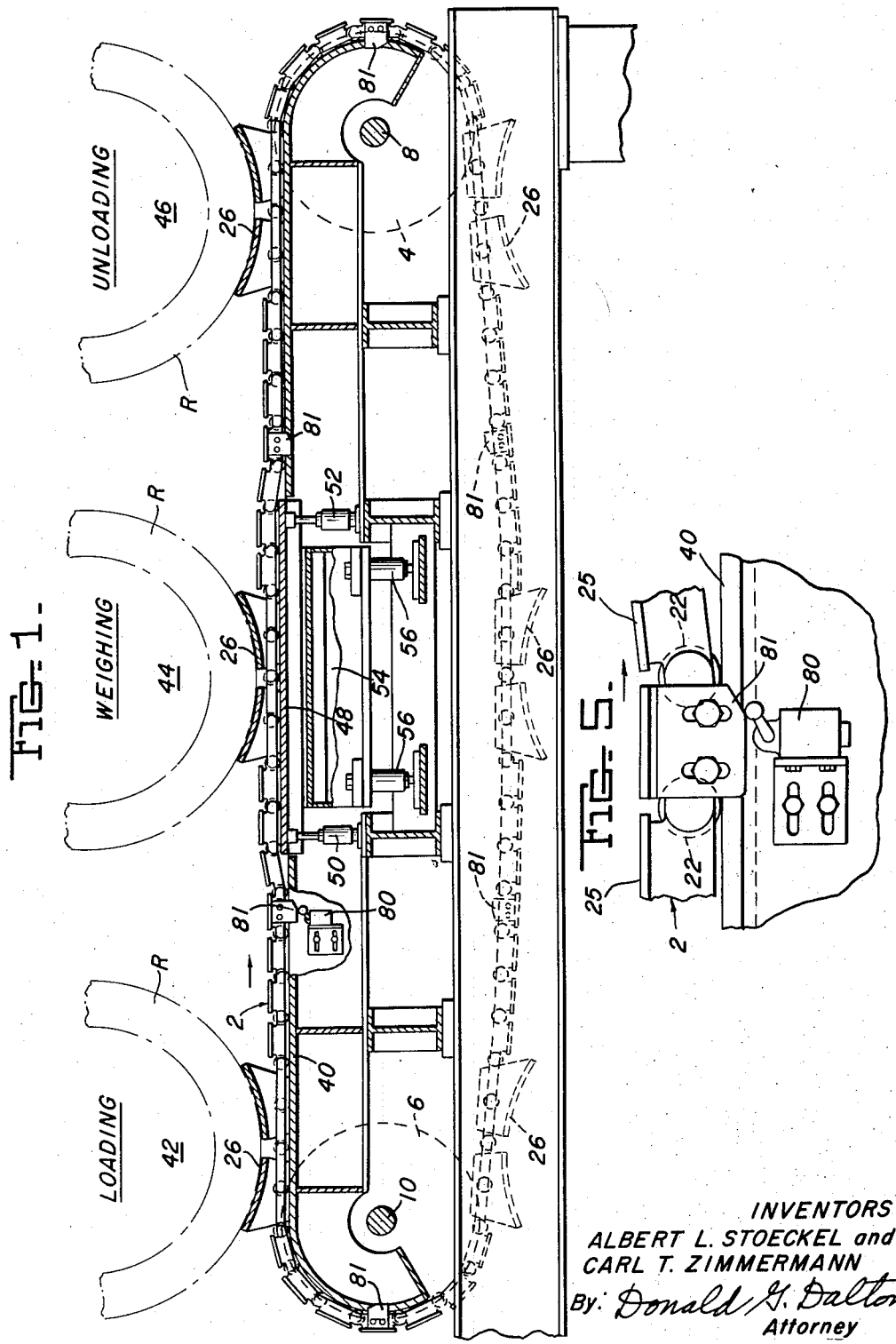

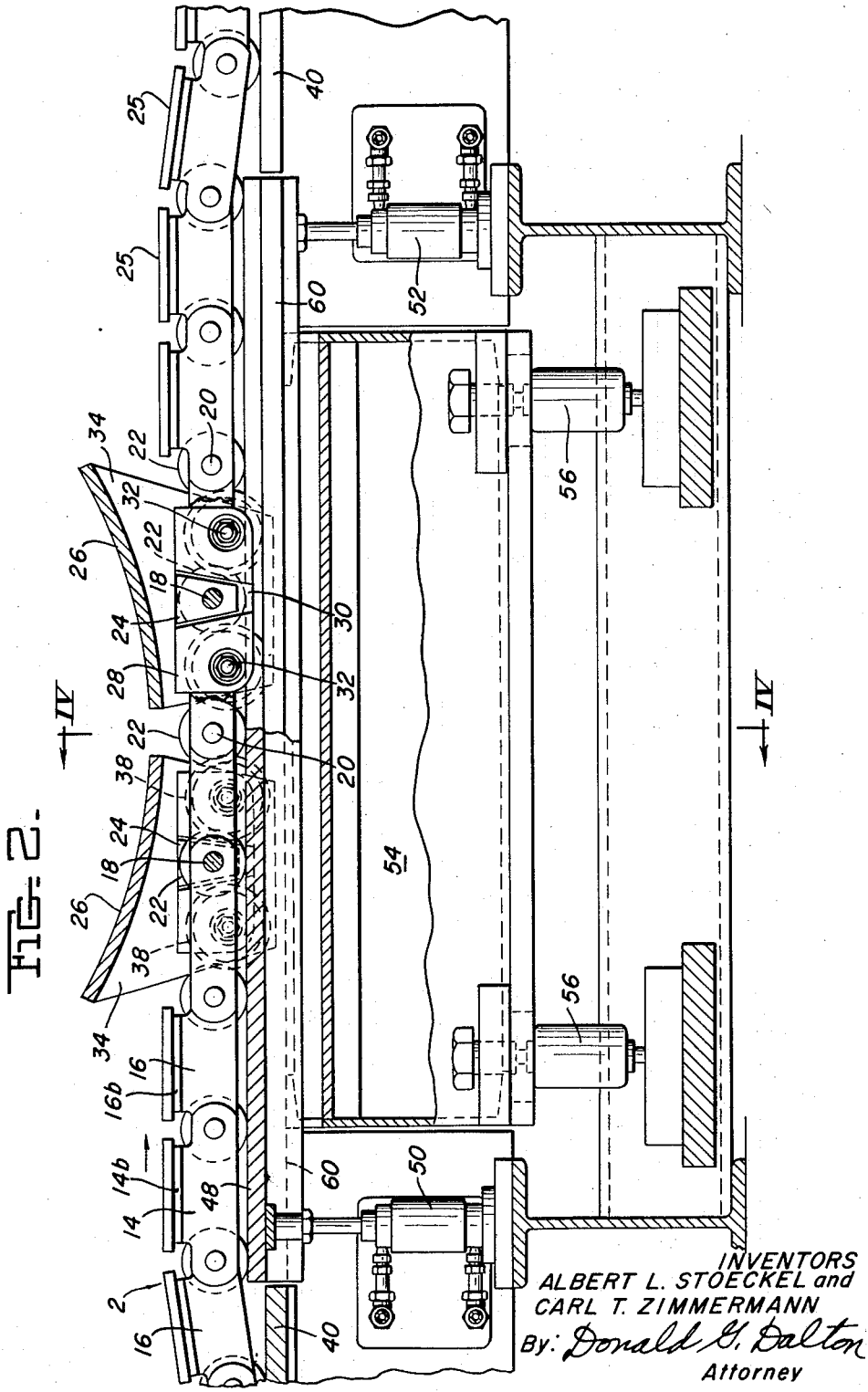

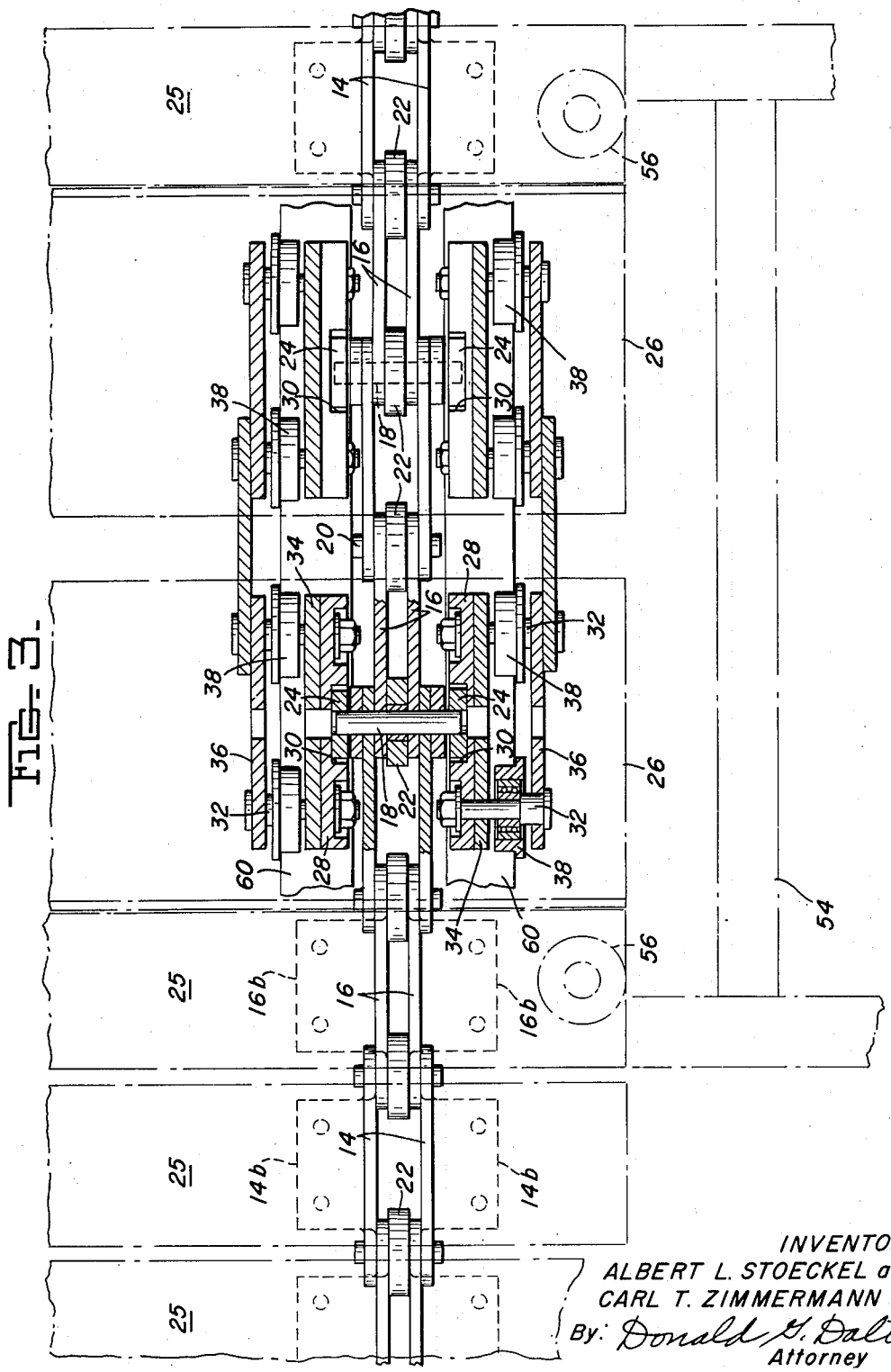

2,905,310

WEIGHING CONVEYOR

Albert L. Stoeckel, Euclid, and Carl T. Zimmermann, Cleveland Heights, Ohio, assignors to United States Steel Corporation, a corporation of New Jersey Application September 24, 1957, Serial No. 685,963

4 Claims. (Cl. 198—39)

This invention relates to a weighing conveyor and more particularly to a conveyor for transporting and weighing bundles of rod. To accurately weigh the bundles it is necessary that the bundle cradles be released from engagement with the conveyor chains.

It is therefore an object of our invention to provide a weighing conveyor in which the bundles of rod or other objects are weighed accurately and automatically.

This and other objects will be more apparent after referring to the following specification and attached drawings, in which:

Figure 1 is a longitudinal vertical section through the conveyor;

Figure 2 is an enlarged view of a portion of Figure 1;

Figure 3 is a horizontal view, partly in section, of one side of the conveyor with some parts being shown in phantom;

Figure 4 is a view taken on the line IV—IV of Figure 2;

Figure 5 is an enlarged elevation of a detail; and

Figure 6 is a schematic view of the hydraulic and electrical controls.

Referring more particularly to the drawings, the reference numeral 2 indicates a plurality of endless chains arranged in parallel relationship. The chains 2 pass around sprockets 4 and 6 which are mounted on shafts 8 and 10, respectively. Shaft 8 is driven by means of a motor 12. Each of the chains 2 is made up of a plurality of links 14 and 16 connected by means of pins 18 and 20. Rollers 22 are mounted on the pins 18 and 20 between the links 16. The pins 18 have a driving key 24 at each end thereof. As shown the driving key 24 is keystone shaped with its larger base above the pin 18 on the upper run of the chain. The chains 2 are connected by means of plates 25 supported by means of brackets 14b and 16b attached to links 14 and 16, respectively. A plurality of spaced cradles 26 extend between and are carried by the chains 2. It is preferred that the cradles 26 be made in two parts as shown to facilitate travel around the sprockets 4 and 6. A link 28 is mounted adjacent each end of each pin 18 and is provided with a keyway 30 for receiving the driving key 24. A pin 32 is carried by each end of the link 28 and extends outwardly therefrom through links 34 and 36. The links 34 and 36 are attached to cradle 26. A wheel 38 is mounted on each pin 32 between the links 34 and 36. A track 40 is provided for supporting the rollers 22 and wheels 38. As shown the conveyor is provided with a loading station 42, a weighing station 44 and an unloading station 46. However, it will be understood that more than these three stations may be provided if desired. The track 40 is interrupted at the weighing station and a lifting beam 48 is inserted to form the track at this position. The beam 48 may be raised from a lower position at the same elevation as the track 40 to a position thereabove by means of two hydraulic cylinders 50 and 52. A weighing platform 54 which extends the full width of the conveyor is provided at the weighing station. The platform 54 is supported by four load cells 56, one adjacent each corner thereof. The load cells at one side of the conveyor are shown in Figure 3, it being understood that the arrangement of the chain and cells at the other side of the conveyor will be the same and that intermediate chains of the same construction may be provided between the side chains. The output of the load cells 56 is connected to a weight recorder 58. The cells 56 and recorder 58 form a conventional scale. A suitable recorder is the type 9600 Console manufactured by International Business Machines Corporation. A track 60 is carried by the weighing platform 54 one on each side of each beam 48 for supporting the wheels 38. A pump 62 provides fluid for raising and lowering the beams 48. A 4-way valve 64 controls flow of the fluid to the cylinders 50 and 52. The fluid flows from the valve 64 through conduits 66 to the bottom of cylinders 50 and 52 and through conduit 68 to the top of cylinders 50 and 52. A pressure switch 70 is connected to the conduit 66 and a similar pressure switch 72 is connected to the conduit 68. Pressure switch 70 is in circuit with the weight recorder 58 and when closed starts the weighing cycle. The switch 72 is connected to a 110 volt A.C. power source L1—L2 in circuit with a light 74. A relay coil 76 is connected in parallel with the light 74 and has normally open contact 76C which is connected in series with conveyor motor 12 and a manually operable starter switch 78. A relay coil 79 having normally open contact 79C is connected in parallel with motor 12. A limit switch 80 is mounted adjacent the entry end of the weighing station 44. A limit switch cam 81 is mounted on one of the endless chains 2 between each pair of cradles 26 and is adapted to actuate the switch 80. Switch 80 has normally closed contact 80C and normally open contact 80C1. Contact 80C is arranged in parallel with switch 78 and in series with contact 79C. Contact 80C1 is arranged in series with a relay coil 82 having normally open contact 82C. Relay coil 82 and contact 82C form a time delay relay with the contact 82C closing momentarily and then opening after a predetermined time interval. The position of valve 64 is controlled by solenoids 64S and 64S1. Solenoid 64S is connected in series with contact 82C, and contact 82C and solenoid 64S are connected in parallel with coil 82. Solenoid 64S1 is connected to power source L1—L2 through contact 58C which forms part of the weight recorder and closes at the end of a weighing cycle.

The operation of our device is as follows:

Bundles of rod R are positioned on cradle 26 at the loading station 42 after which the operator depresses the starter switch 78 which through closed contact 76C completes a circuit through motor 12 to move the conveyor chains 2. Depressing of switch 78 also energizes relay coil 79 completing a holding circuit to motor 12 through closed contacts 79C and 80C. Thus, when the operator removes his finger from switch 78 allowing it to open, the motor 12 remains energized. When the cam 81 between the loading station 42 and weighing station 44 contacts the switch 80 it opens contact 80C and de-energizes motor 12, thus causing the cradle 26 to stop at the weighing station 44. At the same time contact 80C1 closes, thus energizing coil 82 and closing contact 82C momentarily. This energizes solenoid 64S which operates valve 64 so that fluid is delivered from the pump 62 through conduit 66 to the lower end of cylinders 50 and 52, thus raising beams 48. By the time the conveyor stops the switch 80 will have left the cam 81 and the contact 80C will be closed and the contact 80C1 open. As beams 48 rise they move the chains 2 upwardly. This upward movement moves the driving keys 24 out of engagement with the keyways 30 so that the cradle 26 with the bundles of rod thereon is supported on the tracks 60 carried by the weighing platform 54. When the beams 48 reach their uppermost position the pressure in the conduit 66 rises sufficiently to close switch 70, thus starting the weighing cycle. At the end of the weighing cycle contacts 58C close, thus completing a circuit through solenoid 64S1. Before this time the time delay relay 82 will have opened, deenergizing solenoid 64S. This causes movement of valve 64 to a position where fluid from pump 62 is delivered through conduit 68 to the top of cylinders 50 and 52, thus lowering the beams 48. When the beams 48 reach their lowermost position pressure builds up in conduit 68, thus closing switch 72. Closing of switch 72 causes signal light 74 to light so that the operator knows that the weighing cycle is completed. Closing of switch 72 also energizes relay 76 to close contact 76C which had previously opened when pressure was applied at the bottom of cylinders 50 and 52. In the meantime bundles of rods R will have been removed from the cradle 26 at the unloading station 46 and when the cradle at the loading station 42 is loaded with bundles the operator will again depress the switch 78 to start another cycle.

While one embodiment of our invention has been shown and decribed it will be apparent that other adaptations and modifications may be made without departing from the scope of the following claims.

We claim:

1. A weighing conveyor comprising a plurality of endless chains arranged in parallel relationship, a plurality of cradles supported by said chains, means detachably connecting each of said cradles to said chains, a weighing platform, means adjacent said weighing platform for moving said connecting means from operative engagement with the cradle at said weighing platform so as to support said cradle on said weighing platform, a motor for moving said conveyor chains, a switch operable by one of said chains to stop said motor and operate said detaching means, means for weighing said cradle and any load thereon, and means associated with said weighing means for restoring said detaching means to its original position when the weighing is complete.

2. A weighing conveyor comprising a plurality of endless chains arranged in parallel relationship and including rollers and keys, a plurality of cradles supported by said chains, means detachably connecting each of said cradles to said chains, said means including wheels on each side of said rollers and supports for said wheels, said supports having generally vertical keyways therein for receiving said keys, a weighing platform, tracks on said platform for carrying said wheels, a track for said rollers, said roller track including a vertically movable member at said weighing platform, means for moving said member vertically to move said keys out of contact with said keyways, and means for weighing said cradle and any load thereon.

3. A weighing conveyor comprising a plurality of endless chains arranged in parallel relationship and including rollers and keys, a plurality of cradles supported by said chains, means detachably connecting each of said cradles to said chains, said means including wheels on each side of said rollers and supports for said wheels, said supports having generally vertical keyways therein for receiving said keys, a weighing platform, a weight recorder associated with said weighing platform, tracks on said platform for carrying said wheels, a track for said rollers, said roller track including a vertically movable member at said weighing platform, means for moving said member vertically, a motor for moving said conveyor chains, a switch operable by one of said chains to stop said motor and raise said roller track whereby said keys are moved out of contact with said keyways, movement of said roller track to its upper position initiating the weighing cycle, and means associated with said weight recorder for lowering said roller track when the weighing is completed.

4. A weighing conveyor comprising a plurality of endless chains arranged in parallel relationship and including rollers and keys, a plurality of cradles supported by said chains, means detachably supporting each of said cradles on said chains, said means including wheels on each side of said rollers and supports for said wheels, said supports having generally vertical keyways therein for receiving said keys, a weighing platform, load cells supporting said weighing platform, a weight recorder connected to the output of said load cells, tracks on said platform for carrying said wheels, a track for said rollers, said roller track including a vertically movable member at said weighing platform, hydraulic cylinders for moving said member vertically, a motor for moving said conveyor chains, a switch on the approach side of said weighing platform, said switch being operable by one of said chains to stop said motor and raise said roller track whereby said keys are moved out of contact with said keyways, movement of said roller track to its upper position initiating the weighing cycle, and means associated with said weight recorder for lowering said roller track when the weighing is completed.

References Cited in the file of this patent

UNITED STATES PATENTS

| | | |
|---|---|---|
| 2,124,678 | Talbot | July 26, 1938 |
| 2,347,068 | Sneed | Apr. 18, 1944 |
| 2,359,786 | Pechy | Oct. 10, 1944 |